United States Patent [19]

Rodriguez

[11] Patent Number: 4,624,556
[45] Date of Patent: Nov. 25, 1986

[54] FOLDING WORK ORGANIZER

[75] Inventor: Paul A. Rodriguez, Voorheesville, N.Y.

[73] Assignee: Xerox Corporation, Stamford, Conn.

[21] Appl. No.: 754,810

[22] Filed: Jul. 12, 1985

[51] Int. Cl.⁴ .......................... G03B 27/62; A47F 7/00; A47F 3/14; A47J 47/00

[52] U.S. Cl. ........................................ 355/75; 211/55; 211/130

[58] Field of Search ..................... 355/75; 211/55, 130

[56] References Cited

U.S. PATENT DOCUMENTS 626,141  5/1899  Carter ............................... 211/55 X
4,444,493  4/1984  Webster et al. ......................... 355/75

Primary Examiner—Richard A. Wintercorn
Attorney, Agent, or Firm—H. Fleischer; J. E. Beck; R. Zibelli

[57] ABSTRACT

An apparatus in which original documents used in an electrophotographic printing machine are temporarily stored. The apparatus is mounted on the unused space of the printing machine to organize the original documents to be processed therein. A plurality of trays are mounted pivotably on the base of the apparatus. The trays pivot from a nested position wherein they occupy a minimum amount of space on the printing machine to a substantially vertical position defining a plurality of bins for temporarily storing the original documents therein.

10 Claims, 4 Drawing Figures

FOLDING WORK ORGANIZER

This invention relates generally to an apparatus for temporarily storing sheet like material to be processed in a printing machine.

Generally, in small copiers there is a lack of useful work space to hold or store original documents prior to making copies thereof. Various types of devices have been employed hereinbefore for collating copy sheets produced by the printing machine. These devices include a plurality of bins arranged in rows. The copy sheets are inserted serially into each bin to obtain fully collated sets. Manual collators, as well as automatic collators have been devised for use in conjunction with electrophotographic printing machines. A manual collator is usually positioned at the output station of the copier to facilitate the operators arrangement of sets of copies. Similarly, for high speed reproducing machines, automatic collators or sorters have been utilized which are also located at the output station of the copier. These sorters distribute the copy sheets in individual bins to form sets of copies which correspond to the sets of original documents being reproduced. The manual or automatic sorter extends from one end of the copier. This extends beyond the base footprint of the copier, taking up space that may be utilized for other purposes in the office environment as well as increasing the likelihood of breakage. Thus, it is highly desirable to provide a work organizer for the top surface of a copier that has a limited amount of usable work space. The work organizer ideally will take up a limited amount of surface area, provide sufficient space for the copier user to organize the original documents for simplicity of use, and will move to an inoperative position out of the operators way when not in use.

Various approaches have been devised for storing original documents which are being reproduced by an electrophotographic printing machine. The following disclosure appear to be relevant:

U.S. Pat. No.: 4,011,952, Patentee: Smith et al., issued: Mar. 15, 1977.

Xerox Disclosure Journal, Volume 4, No. 4, July/August 1979, Page 437; Author: Markovitz.

The relevant portions of the foregoing disclosures may be briefly summarized as follows:

In column 1, lines 17-24, inclusive, Smith et al. describes a work organizer for use with a Xerox 720 copier. The work organizer has two vertical rows of generally horizontal sheet receiving bins which are placed at the side of the output tray of the copier. The bins are arranged so that the sheets are placed in them horizontally. This device is used for organizing originals for copying.

Markovitz describes a work shelf assembly and paper organizer for a small copier. The shelf has a base with a document retaining portion attached thereon. The base is attached to the rear cover of the copier. The document retaining portion thereof has a plurality of document supporting walls which form slots for retaining different groups of documents. The ends cooperate with the walls to retain the documents in place.

In accordance with one aspect of the features of the present invention, there is provided an apparatus for temporary storage and retrieval of sheet like material. The apparatus includes a base having a plurality of trays mounted pivotably thereon. The trays pivot from an inoperative position having one of the plurality of trays in juxtaposition with the base with the remaining ones of the plurality of trays being in juxtaposition with one another to an operative position wherein each one of the plurality of trays are spaced from one another and extend in a direction substantially transverse to the base to define a plurality of bins for holding the sheet like material therein.

Pursuant to another aspect of the present invention, there is provided a reproducing machine of the type having means for reproducing a copy of an original document on a copy sheet. The improvement therein comprises an apparatus for the temporary storage of original documents. The apparatus includes a base mounted on the reproducing machine. A plurality of trays are mounted pivotably on the base. The trays pivot from an inoperative position having one of the plurality of trays in juxtaposition with the base with the remaining ones of the plurality of trays being in juxtaposition with one another to an operative position with each one of the plurality of trays being spaced from one another and extending in a direction substantially transverse to the base to define a plurality of bins for holding the original documents therein.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
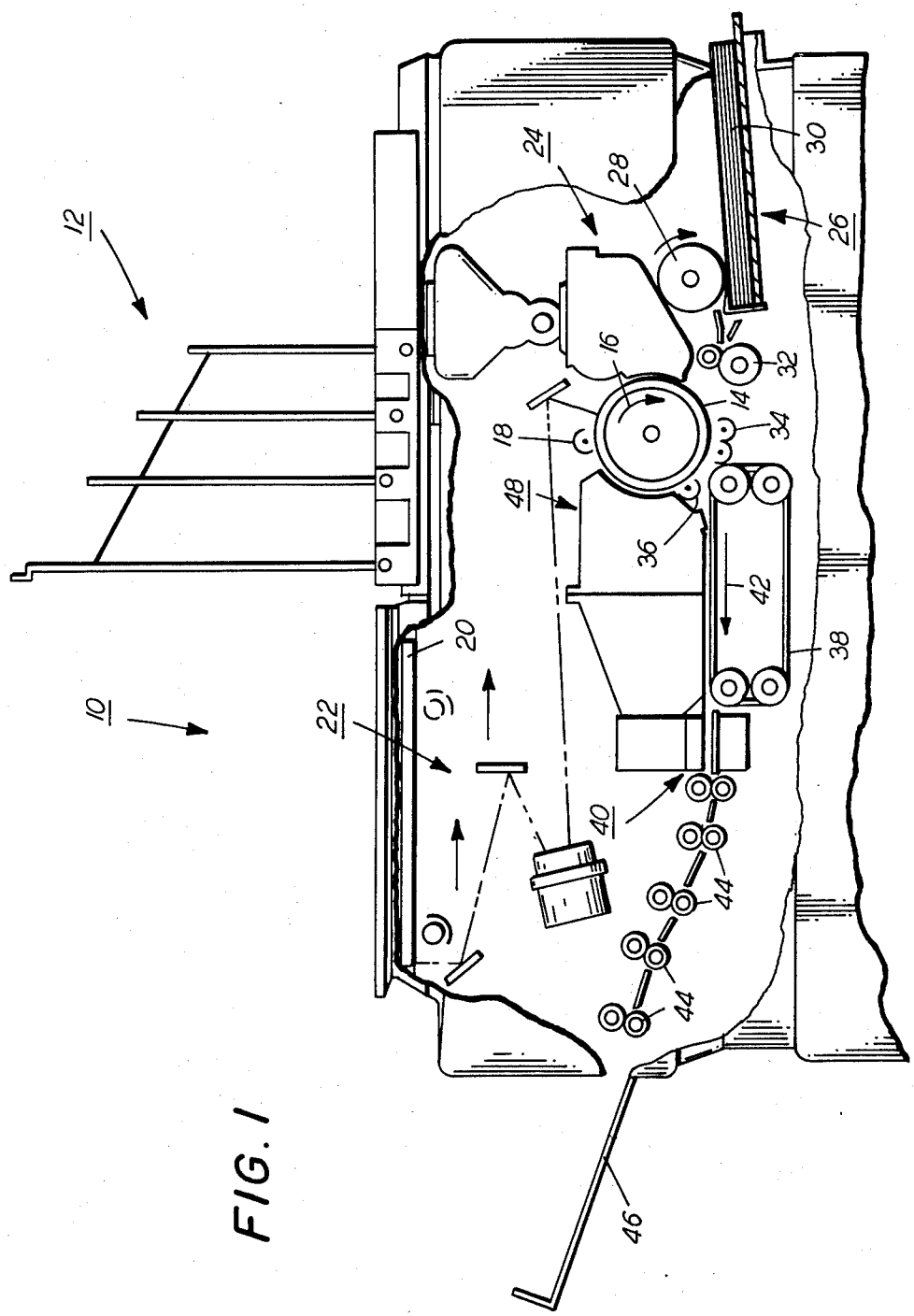
FIG. 1 is a schematic elevational view illustrating an electrophotographic printing machine incorporating the apparatus for the temporary storage of original documents thereon.

For a general understanding of the features of the present invention, reference is made to the drawing. In the drawings, like reference numerals have been used throughout to designate identical elements. FIG. 1 schematically depicts the various components of an illustrative electrophotographic printing machine having the folding work organizer of the present invention mounted thereon. It will become apparent from the following discussion that the folding work organizer described hereinafter is equally well suited for use in a wide variety of printing machines and is not necessarily limited in its application to the particular embodiment shown herein.

Inasmuch as the the art of electrophotographic printing is well known, the various processing stations employed in the illustrative FIG. 1 printing machine will be shown hereinafter schematically and their operation described briefly with reference thereto.

As shown in FIG. 1, the electrophotographic printing machine, indicated generally be the reference numeral 10, has the folding work organizer, indicated generally by the reference numeral 12, mounted thereon in the unused space thereof. Printing machine 10 includes a drum 14 made from a conductive substrate, such as aluminum, having a photoconductive material, i.e. selenium alloy deposited thereon. Drum 14 rotates in the direction of arrow 16 to pass through the various processing stations disposed thereabout.

Initially, drum 14 moves a portion of the photoconductive surface through the charging station. The charging station has a corona generating device, indicated generally by the reference numeral 18, which charges the photoconductive surface of drum 14 to a relatively high, substantially uniform potential.

Thereafter, the charged portion of the photoconductive surface of drum 14 is advanced through the exposure station. At the exposure station, an original document removed manually by the operator from work organizer 12 is positioned face down upon a transparent platen 20. The exposure system, indicated generally by the reference numeral 22, includes a lamp which moves across the original document illuminating incremental widths thereof. Light rays reflected from the original document are transmitted through a moving lens system to form incremental width light images. These light images are focused onto the charged portion of the photoconductive surface. In this manner, the charged photoconductive surface of drum 14 is discharged selectively by the light image of the original document. This records an electrostatic latent image on the photoconductive surface of drum 14 which corresponds to the informational areas contained within the original document.

Next, drum 14 advances the electrostatic latent image recorded on the photoconductive surface to the development station. At the development station, a magnetic brush development system, indicated generally by the reference numeral 24, advances particles into contact with the electrostatic latent image recorded on the photoconductive surface of drum 14. The latent image attracts the particles thereto forming a powder image on the photoconductive surface of drum 14. After the powder image is formed on the photoconductive surface, drum 14 advances the powder image to the transfer station.

At the transfer station, a sheet of support material is positioned in contact with the powder image formed on the photoconductive surface of drum 14. The sheet of support material is advanced to the transfer station by a sheet feeding apparatus, indicated generally by the reference numeral 26. Preferably, sheet feeding apparatus 26 includes a feed roll 28 contacting the uppermost sheet of a stack 30 of sheets of support material. Feed roll 28 rotates in the direction of arrow 32 so as to advance the uppermost sheet from stack 30. Registration rollers 32 align and forward the advancing sheet of support material to the transfer station. The sheet of support material advances to the transfer station where it contacts the photoconductive surface of drum 14 in a timed sequence.

The transfer station includes a corona generating device 34 which sprays ions onto the backside of the sheet. This attracts the powder image from the photoconductive surface of drum 14 to the sheet. After transfer, the sheet continues to move with drum 14 and is separated therefrom by a detack corona generating device 36 which neutralizes the charge causing the sheet to adhere to the drum. Conveyor 38 advances the sheet from the transfer station to the fusing station.

At the fusing station, quartz lamps, indicated generally by the reference numeral 40, heat the powder image on the sheet being advanced by conveyor 38 in the direction of arrow 42 so as to coalesce the powder image thereon and permanently affix it thereto. After fusing, forwarding rollers 44 advance the finished copy sheet to catch tray 46. Once the copy sheet is positioned in catch sheet 46, it may be removed therefrom by the machine operator.

Invariably after the sheet of support material is separated from the photoconductive surface of drum 14, some residual particles remain adhering thereto. These residual particles are cleaned from drum 14 at the cleaning station. Preferably, cleaning station includes a cleaning mechanism, indicated generally by the reference 48, which comprises a pre-clean corona generating device and a rotatable fiberous brush in contact with the photoconductive surface of drum 14. The pre-clean corona generating device neutralizes the charge attracting the particles to the photoconductive surface. The particles are then cleaned from the photoconductive surface by the rotation of the brush in contact therewith. Subsequent to cleaning, a discharge lamp floods the photoconductive surface with light to dissipate any residual electrostatic charge remaining thereon prior to the charging thereof for the next successive imaging cycle.

It is believed that the foregoing description is sufficient for purposes of the present invention to illustrate the general operation of an electrophotographic printing machine incorporating the features of the present invention therein.

Figure 2:
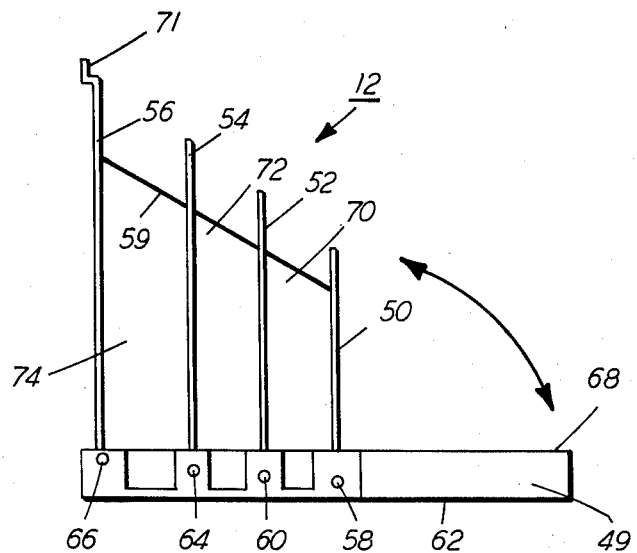
FIG. 2 is a schematic elevational view showing the apparatus for storing the original documents in the operative position.
Figure 3:
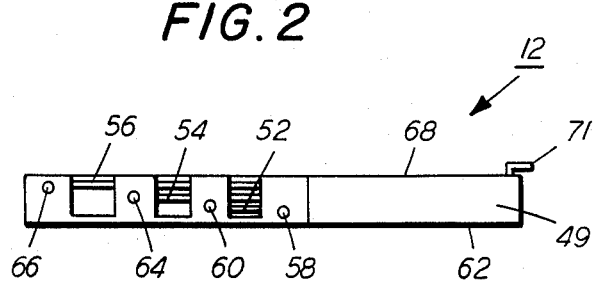
FIG. 3 is a schematic elevational view showing the apparatus for storing original documents in the inoperative position.

Referring now to the specific subject matter of the present invention, FIG. 2 depicts the folding work organizer 12 in greater detail. As shown therein, folding work organizer 12 includes a base 48 having trays 50, 52, 54 and 56 mounted pivotably thereon. Base 48 has a recessed portion therein adapted to receive trays 50, 52, 54 and 56. Thus, the pivot points of trays 50, 52, 54 and 56 are different heights with respect to the bottom of base 48. In this way, the trays are nested adjacent one another when in the closed position and the uppermost tray 56 is located beneath the uppermost surface of base 48. Trays 50, 52, 54 and 56 are connected to one another by a flexible cable 59. Tray 50 has tabs extending from the bottommost portion thereof which are received in openings 58 of base 48. In this way, tray 50 pivots about opening 58 from an inoperative position where it is located in the recessed portion of base 48 to an operative position (as shown) wherein it is substantially normal to base 48. Tray 52 has tabs extending from the lowermost portion thereof on opposed sides thereof which are received in openings 60 of base 48. Thus, tray 52 pivots about opening 60. Opening 60 is at a greater distance from bottom surface 62 of base 48 than is opening 58. In this way, tray 52 may lie adjacent tray 50 in a flat position when in the inoperative position. Tray 54 has tabs extending outwardly from opposed sides of the lowermost portion thereof which are received by openings 64 in base 48. In this way, tray 54 pivots about opening 64. Opening 64 is positioned a distance greater than opening 60 from surface 62 of base 48. In this way, trays 54, 52 and 50 may be positioned horizontally in the recessed portion of base 48 adjacent one another. Tray 56 is mounted pivotably at the lowermost end thereof by having tabs extending outwardly in a horizontal direction which interfit with opening 66 in base 48. Opening 66 is located at a greater distance from surface 62 than opening 64. This enables all of the trays, i.e.

trays 50, 52, 54 and 56 to be received in the recessed portion of base 48 adjacent one another in juxtaposition with the uppermost surface 68 of base 48 being above tray 56. Tray 56 has a handle 71 intergral therewith and located at the free end thereof opposed from the pivotably mounted end. In the inoperative position, handle 71 extends above surface 68 of base 48. This facilitates the grasping of the handle by the operator. As shown in FIG. 2, trays 50, 52, 54 and 56 define three bins. Thus, trays 50 and 52, which are spaced from one another, define bin 70. Trays 52 and 54, which are also spaced from one another, define bin 72. Similarly, trays 54 and 56, which are spaced from one another, define bin 74. When in the operative positin, i.e. when trays 50, 52, 54 and 56 are upright, i.e. extending in a tranverse direction to base 48 preferrably being perpendicular thereto original documents may be temporarily stored in bins 70, 72 and 74. These original documents may be removed from their respective bins and placed on the platen of the printing machine for reproduction. After being reproduced, the original documents may be returned to their respective bin. After all of the original documents have been copied and the work cycle completed, the operator can remove the original documents from bins 70, 72 and 74 and grasp handle 71 to pivot tray 56 in the clockwise direction. As tray 56 pivots in the clockwise direction, it engages tray 54 which in turn, pivots in the clockwise direction. Tray 56, in turn, engages tray 52, which also pivots in the clockwise direction. Finally, tray 52 engages tray 50 to pivot this tray, as well, in the clockwise direction. All of the foregoing trays are received in the recessed portion of base 48 with handle 70 extending above surface 68 thereof. The foregoing is shown more clearly in FIG. 3. FIG. 3 depicts folding work organizer 12 in the inoperative position.

Referring now to FIG. 3, trays 50, 52, 54 and 56 pivot about the respective openings 58, 60, 64 and 66 in base 48 to the inoperative position. In the inoperative position, trays 50, 52, 54 and 56 are nested, i.e. adjacent one another in juxtaposition, in the recessed portion of base 48. Handle 70 of tray 56 extends above the uppermost surface 68 of base 48. Holes 58, 60, 64 and 66 in base 48 are arranged so as to be progressively at a greater distance from surface 62 of base 48. This permits the nesting of trays 50, 52, 54 and 56 with one another in a substantially horizontal position. In order to place the folding work organizer in the operative position, the operator grasps handle 70 and pivots tray 56 in a counter clockwise direction. As tray 56 moves upwardly, cable 59 becomes taunt pulling tray 54 therewith. Similarly, trays 52 and 50 are also moved to the upright or vertical position by cable 59. Thus, the operator merely grasps handle 71 and pivots tray 56 in a counter clockwise direction to place all of the trays in the operative position defining a plurality of bins for storing original documents temporarily therein.

Figure 4:
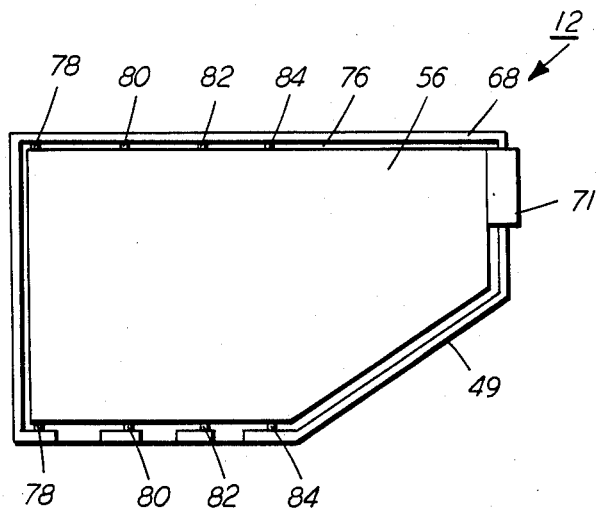
FIG. 4 is a plan view of the FIG. 3 apparatus for storing original documents.

Referring now to FIG. 4, there is shown a plan view of folding work organizer 12. As shown in FIG. 4, the folding work organizer 12 is in the inoperative position with trays 50, 52, 54 and 56 positioned in juxtaposition with one another and in recessed portion 76 of bin 48 with all of the trays being beneath the upper surface 68 of base 48. Each tray has tabs extending from the sides thereof which engage the respective openings in base 48. Tray 56 has tabs 78 which engage openings 66 to mount tray 56 pivotably on base 48. Tray 54 has tabs 80 in the lowermost portion thereof which interfit in opening 64. This mounts tray 54 pivotably on base 48. Tray 52 has tabs 82 integral with the lowermost portion thereof and extending outwardly so as to interfit with openings 60 in base 48. In this way, tray 52 is mounted pivotably on base 48. Tray 50 has tabs 84 extending outwardly from the lowermost portion thereof so as to interfit into hole 58 of base 48. Thus, tray 50 is also mounted pivotably on base 48.

In recapitulation, it is clear that the folding work organizer used in conjunction with the electrophotographic printing machine has a plurality of trays mounted pivotably on a base. In the inoperative position, the trays are nested in a recessed portion of the base. In the operative position, the trays are positioned in a vertical orientation substantially normal to the base so as to define a plurality of bins for storing original documents therein. The work organizer is adapted to be mounted on the unused portion of the printing machine so as to provide temporary storage space for original documents being reproduced.

It is, therefore, evident that there has been provided, in accordance with the present invention, an apparatus for temporarily storing and retrieving original documents being reproduced by an electrophotographic printing machine. This apparatus fully satisfies the aims and advantages hereinbefore set forth. While this invention has been described in conjunction with a specific embodiment thereof, it is evident that may alternatives, modifications, and variations will be apparent to those skilled in the art. Accordingly, it is intended to embrace all such alternatives, modifications, and variations as fall within the spirit and broad scope of the appended claims.

I claim:

1. An apparatus for temporary storage and retrieval of sheet like material, including:
   a base:
   a plurality of trays mounted pivotably on said base, said trays pivoting from an inoperative position having one of said plurality of trays in juxtaposition with said base with the remaining ones of said plurality of trays being in juxtaposition with one another to an operative position with each one of said plurality of trays being spaced from one another and extending in a direction substantially transverse to said base to define a plurality of bins for holding the sheet like material therein; and
   flexible means for connecting each one of said plurality of trays so that as the outermost tray of said plurality of trays pivots from the inoperative position to the operative position the remainder of said plurality of trays pivot therewith from the inoperative position to the operative position.

2. An apparatus for temporary storage and retrieval of sheet like material, including:
   a base;
   a plurality of trays mounted pivotably on said base, said trays pivoting from an inoperative position having one of said plurality of trays in juxtaposition with said base with the remaining ones of said plurality of trays being in juxtaposition with one another to an operative position with each one of said plurality of trays being spaced from one another and extending in a direction substantially transverse to said base to define a plurality of bins for holding the sheet like material therein, said base includes a recessed portion adapted to receive said plurality of trays therein in the inoperative position with the outermost tray being recessed beneath the uppermost surface of said base; and means for connecting each one of said plurality of trays so that as the outermost tray of said plurality of trays pivots from the inoperative position to the operative position the remainder of said plurality of trays pivot therewith from the inoperative position to the operative position.

3. An apparatus according to claim 2, wherein the outermost tray of said plurality of trays includes a handle extending from the end thereof opposed from the end mounted pivotably on said base, said handle extending above the uppermost surface of said base, when said plurality of trays are in the inoperative position,'to facilitate accessibility by an operator.

4. An apparatus according to claim 3, wherein said connecting means includes a flexible cable.

5. An apparatus according to claim 4, wherein said said plurality of trays are spaced from one another, substantially normal to said base and substantially parallel to one another in the operative position.

6. A reproducing machine of the type having means for producing a copy of an original document on a copy sheet, wherein the improvement therein comprises an apparatus for the temporary storage of original documents, including:

a base mounted on the reproducing machine;

a plurality of trays mounted pivotably on said base, said trays pivoting from an inoperative position having one of said plurality of trays in juxtaposition with said base with the remaining ones of said plurality of trays being in juxtaposition with one another to an operative position with each one of said plurality of trays being spaced from one another and extending in a direction substantially transverse to said base to define a plurality of bins for holding the sheet like material therein; and flexible means for connecting each one of said plurality of trays so that as the outermost tray of said plurality of trays pivots from the inoperative position to the operative position the remainder of said plurality of trays pivot therewith from the inoperative position tot he operative position.

7. A reproducing machine of the type having means for producing a copy of an original document on a copy sheet, wherein the improvement therein comprises an apparatus for the temporary storage of original documents, including:

a base mounted on the reproducing machine;

a plurality of trays mounted pivotably on said base, said trays pivoting from an inoperative position having one of said plurality of trays in juxtaposition with said base with the remaining ones of said plurality of trays being in juxtaposition with one another to an operative position with each one of said plurality of trays being spaced from one another and extending in a direction substantially transverse to said base to define a plurality of bins for holding the sheet like material therein, said base includes a recessed portion adapted to receive said plurality of trays therein in the inoperative position with the outermost tray being recessed beneath the uppermost surface of said base; and means for connecting each one of said plurality of trays so that as the outermost tray of said plurality of trays pivots from the inoperative position to the operative position the remainder of said plurality of trays pivot therewith from the inoperative position to the operative position.

8. A reproducing machine according to claim 7, wherein the outermost tray of said plurality of trays includes a handle extending from the end thereof opposed from the end mounted pivotably on said base, said handle extending above the uppermost surface of said base, when said plurality of trays are in the inoperative position, to facilitate accessibility by an operator.

9. A reproducing machine according to claim 8, wherein said connecting means includes a flexible cable.

10. A reproducing machine according to claim 9, wherein said said plurality of trays are spaced from one another, substantially normal to said base and substantially parallel to one another in the operative position.

* * * * *